(No Model.)
J. BLOCH.
CHRONOLOGICAL SKELETON CHART.
No. 574,703. Patented Jan. 5, 1897.
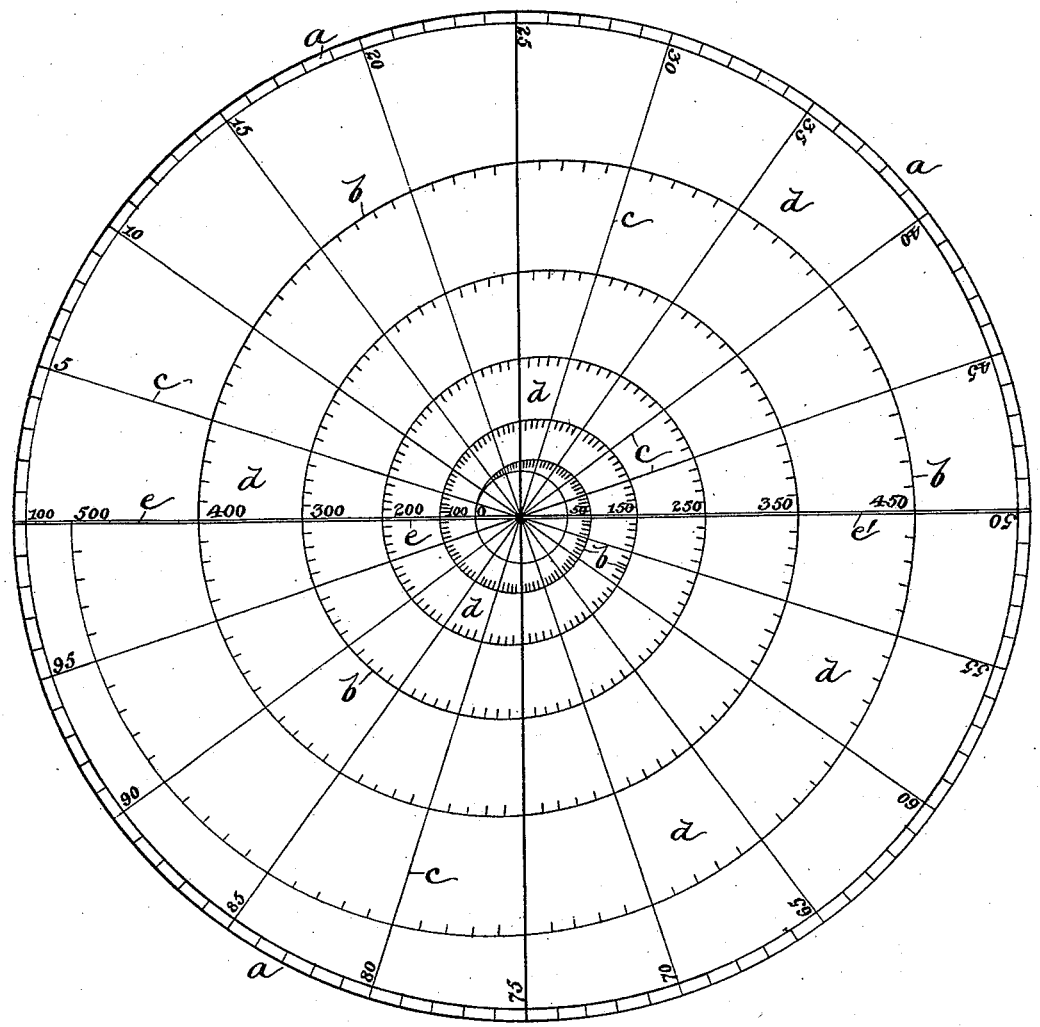
WITNESSES
INVENTOR
Jacob Bloch

UNITED STATES PATENT OFFICE.

JACOB BLOCH, OF PORTLAND, OREGON.

CHRONOLOGICAL SKELETON CHART.

SPECIFICATION forming part of Letters Patent No. 574,703, dated January 5, 1897.

Application filed May 8, 1896. Serial No. 590,772. (No model.)

*To all whom it may concern:*

Be it known that I, JACOB BLOCH, a citizen of the United States, residing at Portland, Multnomah county, State of Oregon, have invented a new and useful Chronological Skeleton Chart, of which the following is a specification, reference being had to the accompanying drawing as a part hereof.

My invention relates to the collation and the graphic arrangement of the data of events in history, science, art, or other topics of interest in chronological and tabular order.

It is my object to furnish some base or form for the student or investigator that will guide him in the arrangement of the memoranda which he desires to record, so as to homogeneously group the same before him in a continuous, comparative, and perspective record. The continuity of my chart will enable the student to arrange his history or statistics in uninterrupted consecutive order. The comparative arrangement enables the student to throw into juxtaposition events which are contemporary as having occurred in some arbitrary epoch or period of time, and the perspective arrangement impresses on the mind the remoteness or proximity of the event as compared with the present time. To this end I have invented a spherical skeleton chart or blank diagram developed on the line of a conical spiral on which the student may write or otherwise insert in proper order the data of important events relating to the subject which he has under investigation, collated in comparative form; that is to say, the subject may be carried through a period of several centuries, continuously represented, while at the same time the respective century periods are orderly grouped, one under the other, so that the student by following any radial line drawn from the pole or center of my chart will be afforded an opportunity of studying the evolution of the subject-matter generally or during a particular interval in consecutive centuries.

The accompanying drawing is a plan of my invention, illustrating the construction thereof.

More particularly describing the same, my chart or diagram is laid out within a circle, the periphery $a$ of which is decimally graduated. From the center or pole of this circle extends a spiral line $b$ and a series of radial lines $c$, thus dividing the surface of the area inclosed within the circle into the gradually-enlarging spaces $d$, following the contour of the spiral line. The object of this arrangement is twofold. In studying the progressive history of any subject the early periods contain the least data, while as we approach the present the individual year may be a milestone in the flight of time, marking the occurrence of some event of great moment; but underlying this object is the more important and fundamental idea of representing the infinity of time by the aid of the perspective. The remoter the event recorded the smaller it will appear, and the more recent the occurrence the more conspicuously will it be shown. By this arrangement the present stands prominently before us, while the bygone time gradually recedes from view until lost into a mere point in the spiral time-line of my chart. The spiral lines $b$ are decimally graduated the same as the peripheral lines $a$. The radial lines $e$ $e'$, dividing the centuries and half-centuries, extend horizontally and may be doubled to be more readily observed as a base of calculation. The vertical quarter-century line may be likewise drawn with some distinguishing feature, as, *e. g.*, a heavy line, and the area of the respective centuries may be tinted to more easily distinguish the same.

In the construction of my skeleton chart I begin at the center or polar point and draw a continuous spiral line, and thereby develop a conical spiral, the area of which I subdivide by a series of radial lines, radiating from such polar or central point, the distance of such radial lines from each other being governed by some arbitrary measurement.

Colors may further be used to designate arbitrary epochs or periods. In addition to the spiral line $b$ further parallel spiral lines may be employed to provide smaller spaces in which to insert the data of matter considered comparatively and contemporaneously with the main topic under investigation, and additional radial lines may be employed to designate collateral matter, as, for example, the different methods of calculating time in use when the recorded events transpired.

A student interested in the examination of any topic being supplied with a chart-blank such as I have described can note in the time areas or spaces thereof the important events which he desires to keep especially in mind, recording the more important events in more conspicuous style or character than the ordinary, if he sees fit, so that when he has reached the end of his researches he will have a graphic record in chronological order and comparative form before him.

These charts or diagrams may be used for recording the statistics or other data of any topic.

Having described my invention, I claim—

A chronological skeleton chart, comprising a sheet of paper or like material having thereon a spherical area traversed by the spiral line $b$ and the radial lines $c$, subdividing such area into the spaces $d$ beginning at the center, and gradually increasing in size, the peripheral lines being decimally graduated throughout, substantially as described.

JACOB BLOCH.

Witnesses:
CECIL H. BAUER,
T. J. GEISLER.